United States Patent [19]
Matt et al.

[11] Patent Number: 6,024,054
[45] Date of Patent: *Feb. 15, 2000

[54] COMBINED RETRACTABLE LEASH AND FLASHLIGHT

[75] Inventors: Brian J. Matt, Wellesley, Mass.; Timothy J. Coonahan, Londonderry, N.H.; Alan D. Ball, Arlilngton, Mass.; Craig A. DuBois, Trumbull; Bryan P. DeBlois, Guiford, both of Conn.

[73] Assignee: The Black & Decker Corporation, Towson, Md.

[ * ] Notice: This patent is subject to a terminal disclaimer.

[21] Appl. No.: 09/232,753

[22] Filed: Jan. 18, 1999

Related U.S. Application Data

[63] Continuation of application No. 08/798,400, Feb. 7, 1997, which is a continuation of application No. 08/639,601, Apr. 29, 1996, Pat. No. 5,762,029
[60] Provisional application No. 60/011,341, Feb. 8, 1996.

[51] Int. Cl.[7] ................................................... A01K 27/00
[52] U.S. Cl. ............................................................ 119/796
[58] Field of Search ..................................... 119/794, 795, 119/796, 797; 362/183, 157, 197, 199, 27; 242/305, 379, 372.2, 405, 405.3, 399.2

[56] References Cited

U.S. PATENT DOCUMENTS

| | | | |
|---|---|---|---|
| 3,198,175 | 8/1965 | Dean | 119/796 |
| 3,776,198 | 12/1973 | Gehrke | 119/796 |
| 4,165,713 | 8/1979 | Brawner et al. | 119/794 |
| 4,173,201 | 11/1979 | Choa et al. | 119/859 |
| 4,269,150 | 5/1981 | McCarthy | 119/796 |
| 5,429,075 | 7/1995 | Passarella et al. | 119/795 |
| 5,483,926 | 1/1996 | Bogdahn | 119/796 |
| 5,558,044 | 9/1996 | Nasser, Jr. et al. | 119/796 |

*Primary Examiner*—Peter M. Poon
*Assistant Examiner*—Elizabeth Shaw
*Attorney, Agent, or Firm*—Saidman DesignLaw Group

[57] ABSTRACT

A retractable leash includes an integral light. The apparatus has a first housing section and a retractable leash section. The first housing section has a handle, a light connected to top front portion of the first housing section and a receiving area. A rechargeable battery is removably connected to the first housing in the handle. The retractable leash section has a second housing section pivotably mounted to the first housing section, in the receiving area, and a reel rotatably mounted to the second housing section. A leash is connected to the reel for extension and retraction relative to the first housing section. In an alternate embodiment, a light is located on the leash and electrically connected to a conductor extending along the leash.

1 Claim, 9 Drawing Sheets

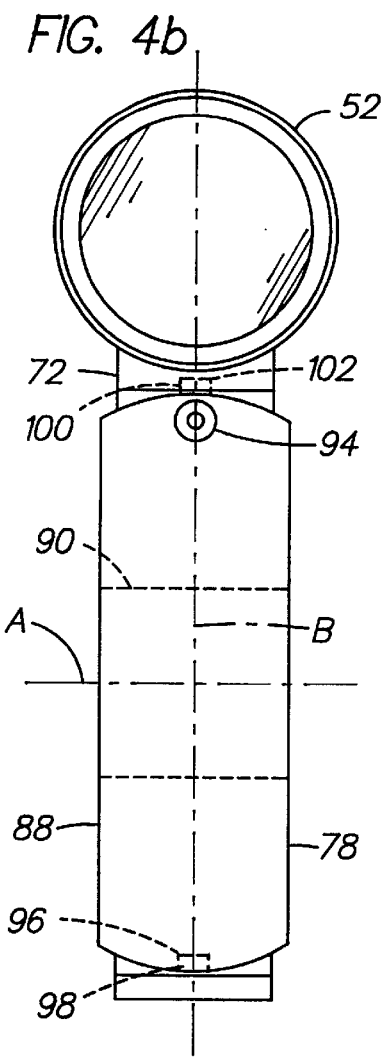
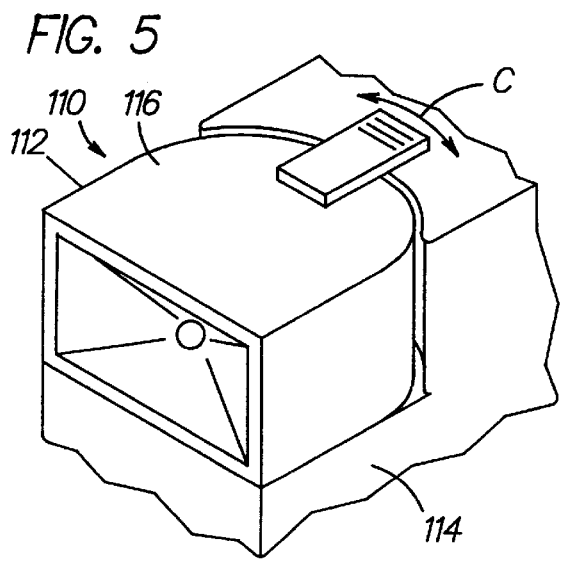
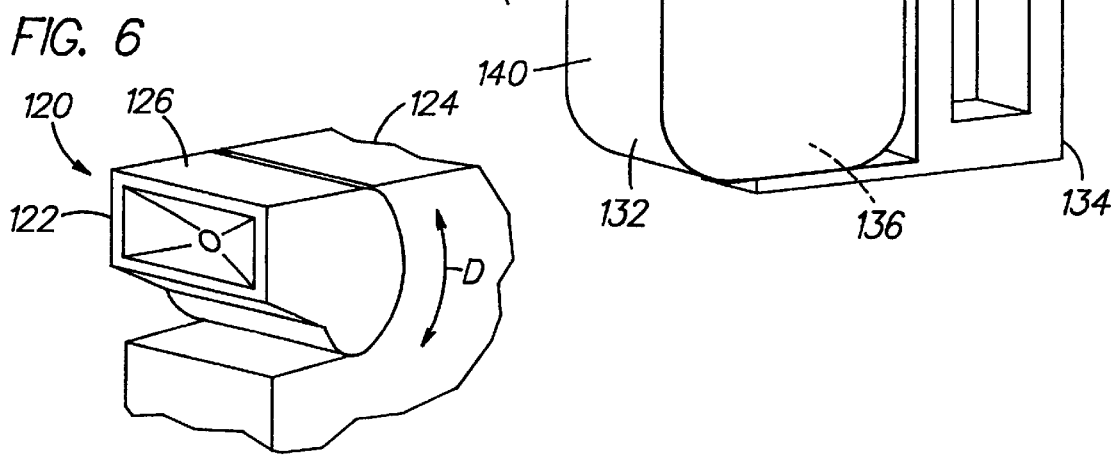

COMBINED RETRACTABLE LEASH AND FLASHLIGHT

CROSS REFERENCE TO RELATED APPLICATIONS

This application (Ser. No. 09/232,753, filed Jan. 18, 1999) is a continuation of Ser. No. 08/798,400, filed Feb. 7, 1997, which is a continuation of Ser. No 08/639,601, filed Apr. 29, 1996 (now U.S. Pat. No. 5,762,029). Two of these applications (Ser. No. 09/232,753; and Ser. No. 08/798,400) claim the benefit of U.S. Provisional App. Serial No. 60/011,341, filed Feb. 8, 1996.

BACKGROUND OF THE INVENTION

1. Field of the Invention

The present invention relates to a pet leash and, more particularly, to a pet leash apparatus having an integral light device.

2. Related Art

Numerous types of retractable pet leashes are known in the art. Examples of some of these leashes can be found in the following U.S. patents.

| | |
|---|---|
| U.S. Pat. No. 2,217,323 | U.S. Pat. No. 2,222,409 |
| U.S. Pat. No. 2,250,171 | U.S. Pat. No. 2,314,504 |
| U.S. Pat. No. 2,647,703 | U.S. Pat. No. 2,776,644 |
| U.S. Pat. No. 2,919,676 | U.S. Pat. No. 3,198,175 |
| U.S. Pat. No. 3,233,591 | U.S. Pat. No. 3,315,642 |
| U.S. Pat. No. 3,318,288 | U.S. Pat. No. 3,693,596 |
| U.S. Pat. No. 3,776,198 | U.S. Pat. No. 3,853,283 |
| U.S. Pat. No. 3,937,418 | U.S. Pat. No. 4,018,189 |
| U.S. Pat. No. 4,165,713 | U.S. Pat. No. 4,197,817 |
| U.S. Pat. No. 4,202,510 | U.S. Pat. No. 4,269,150 |
| U.S. Pat. No. 4,501,230 | U.S. Pat. No. 4,748,937 |
| U.S. Pat. No. 4,796,566 | U.S. Pat. No. 4,887,551 |
| U.S. Pat. No. 5,377,626 | U.S. Pat. No. 5,423,494 |

People who work during the day often walk their pets at night and need to light their way. This usually requires the use of a hand held flashlight. Pets, such as dogs, are usually walked with the aid of a leash and, some laws require that a leash be used when walking a dog in a public area. Thus, walking a pet at night can usually require use of both hands of the user; one hand to hold the leash and one hand to hold the flashlight.

SUMMARY OF THE INVENTION

In accordance with one embodiment of the present invention a retractable leash apparatus is provided comprising a housing, a leash, and a lighting section. The housing has a rotatable reel. The leash is connected to the reel such that the leash can extend and retract relative to the housing. The lighting section has a light and a battery. The battery is located inside the housing.

In accordance with another embodiment of the present invention a retractable leash apparatus is provided comprising a first housing section and a retractable leash section. The first housing section has a handle section and a receiving area. The retractable leash section has a second housing pivotably mounted to the first housing section in the receiving area along a first axis of rotation and a reel rotatably mounted to the second housing section along a second axis of rotation. The first housing section is connected to the second housing section at two opposite ends of the second housing section. The first axis of rotation is orthogonal to the second axis of rotation.

In accordance with another embodiment of the present invention a retractable leash apparatus is provided having a housing, a rechargeable battery connected to the housing, a light connected to the housing, and a leash on a reel of the housing that can be extended from the housing and reeled back towards the housing.

In accordance with another embodiment of the present invention a retractable leash apparatus is provided comprising a housing, a battery, a leash, and a light. The housing has a rotatable reel. The battery is mounted to the housing. The leash is connected to the reel such that the leash can be extended from the housing and retracted onto the reel. The light is mounted on the leash electrically connected to the battery by an electrical conductor extending along the leash.

In accordance with another embodiment, the lighting mechanism preferably comprises a spot light for illuminating the forward walking area near the dog and a flood light for illuminating the walking area of the master. The lighting mechanism further preferably includes a caution strobe or flashing beacon to alert others of the master's whereabouts, if the other lights are turned off. A second caution strobe or flashing beacon unit may be provided at the other end of the leash to indicate the location of the dog; the dog locating flashing beacon unit is retractable into the case along with the leash. The invention may employ batteries which are preferably rechargeable on a wall-mounted unit. The dog-locating flashing beacon unit may also be recharged when retracted into the case.

In accordance with another embodiment, the invention employs a non-retractable leash having only a flashing beacon unit extending from one end of the leash and fastened to the dog's collar. The dog-locating beacon of this embodiment can be used either alone on in combination with a hand-held flashlight unit having built-in spot light and beacon light capabilities.

BRIEF DESCRIPTION OF THE DRAWINGS

The foregoing aspects and other features of the present invention are explained in the following description, taken in connection with the accompanying drawings, wherein:

FIG. 4b is a front view of the combined retractable leash and flashlight assembly shown in FIG. 4a;

FIG. 5 is a partial schematic perspective view of the top front of an alternate embodiment of the present invention;

FIG. 6 is a partial schematic perspective view of another alternate embodiment of the present invention;

FIG. 7 is a partial schematic perspective view of another alternate embodiment of the present invention;

DETAILED DESCRIPTION OF PREFERRED EMBODIMENTS

Figure 1:
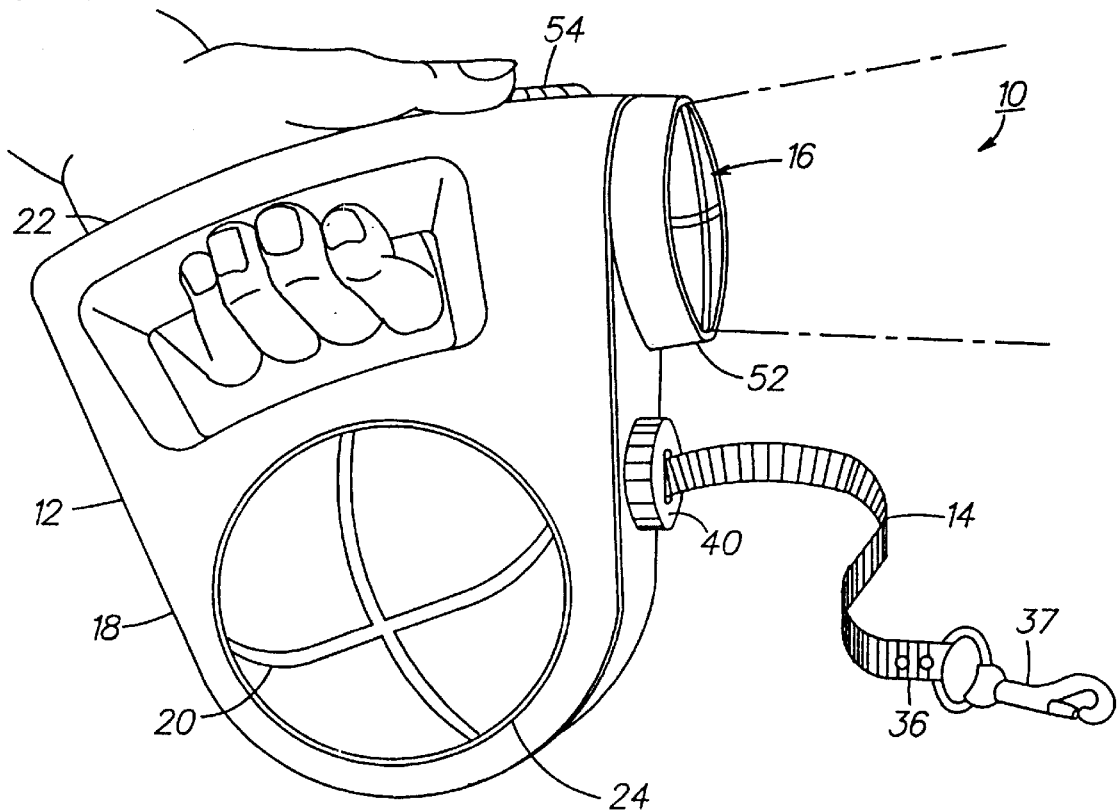
FIG. 1 is an enlarged perspective view of a combined retractable leash and flashlight assembly incorporating features of the present invention.

Referring to FIG. 1, there is shown a perspective view of an apparatus 10 incorporating features of the present invention being held by a user. Although the present invention will be described with reference to the embodiments shown in the drawings, it should be understood that features of the present invention could be embodied in various different forms of alternate embodiments. In addition, any suitable size, shape or type of elements or materials could be used.

Figure 2:
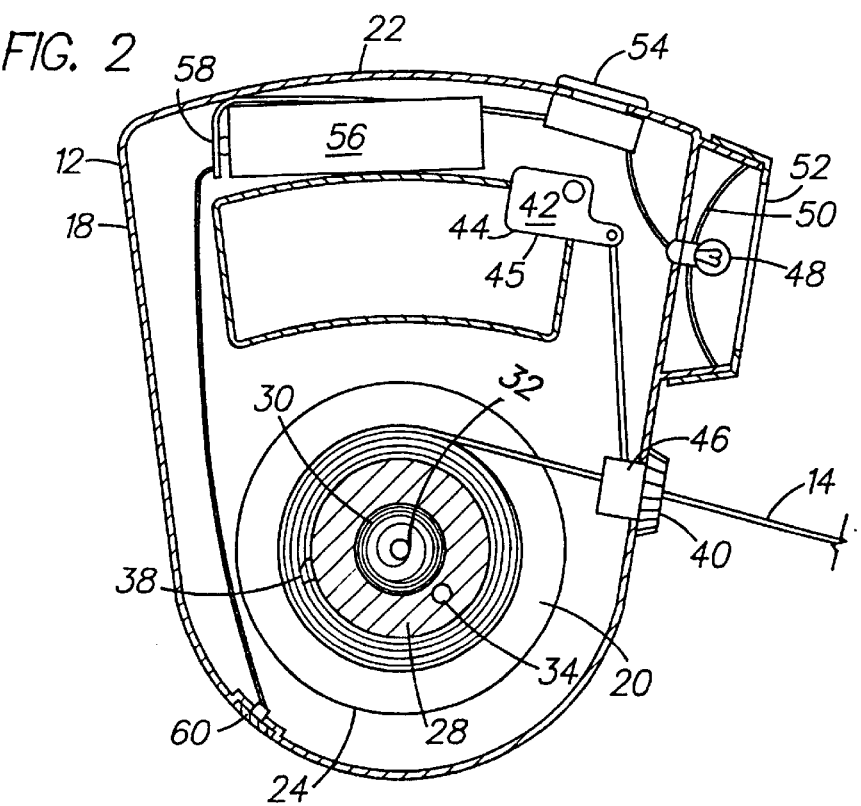
FIG. 2 is a schematic cross-sectional view of the combined retractable leash and flashlight assembly shown in FIG. 1.

The apparatus 10 includes a housing 12, a leash 14 and a lighting section 16. Referring also to FIG. 2, the housing 12 has a first housing section 18 and a retractable leash section 20. The first housing section 18 is preferably made of plastic. The first housing section 18 includes a handle section 22 and a receiving area 24. The retractable leash section 20 includes a reel or drum 28, and a coiled spring 30.

The reel 28 is rotatably connected to the first housing section 18 in the receiving area 24. The spring 30 has a first end 32 connected to the first housing section 18 and a second end 34 connected to the rotatable reel 28. The leash 14 has first end 36 attached to a clip 37 and a second end 38 that is attached to the reel 28. The leash 14 is wrapped around the reel 28 and extends out of the housing 12 at an exit flange 40. The apparatus 10 also include a leash extension brake 42. The brake 42 push button lever 44 pivotably connected to the housing section 18.

A finger contact area 45 is located at the front bottom of the handle section 22 to be upwardly depressed by a user. The lever 44 is attached to a friction brake device 46 at the flange 40. When the lever 44 is actuated by a user, it moves the friction brake device 46 to exert a frictional force on the leash 14 and thereby stop the leash from extension or retraction. In alternate embodiment, any suitable type of brake devices could be used, such as disclosed in U.S. Pat. Nos. 5,423,494; 5,377,626; 4,501,230; 4,269,150; or any of the other patents identified in the prior art section above. In addition, any suitable type of retractable leash section could be provided. The housing could also have any suitable type of shape.

Figure 3:
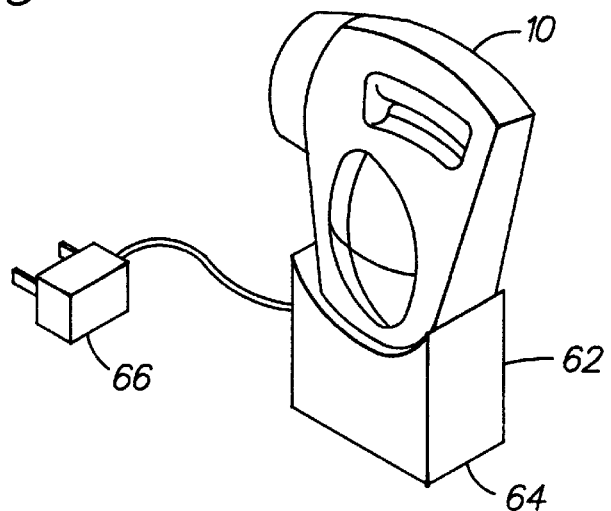
FIG. 3 is a schematic perspective view of the combined retractable leash and flashlight assembly shown in FIGS. 1 and 2 attached to a battery recharging stand.

The lighting section 16 generally comprises a light bulb 48, a reflector 50, a cover 52, a switch 54, and a battery 56. The light bulb 48 is electrically connected to the battery 56 by the switch 54. The switch 54 is located at the top of the handle section 22 to be actuated by a user's thumb. The cover 52 is threadingly mounted to the housing 12 to keep the reflector 50 in place. In the embodiment shown, the light bulb 48 and reflector 50 are located at the top front of the housing 12. However, in an alternate embodiment they could be located at the bottom of the housing or any other suitable location on the housing 12. The lighting section 16 also includes a small circuit board 58 connected to the battery 56 and to contact terminals 60 adjacent the exterior of the housing 12. In this embodiment the battery 56 is a rechargeable battery made of a suitable material such as NiCad. The terminals 60 and printed circuit board 58 provide a means to connect the battery 56 to a suitable recharger 62 (see FIG. 3) for recharging the battery. In an alternate embodiment, the battery need not be a rechargeable battery and, suitable means would be provided to remove and replace such a non-rechargeable battery. Referring also to FIG. 3, the apparatus 10 is shown mounted in a recharger stand 62.

The stand 62 has a housing 64 that can preferably be mounted to a wall. The stand 62 has a plug-in transformer 66 that can be plugged into an electrical wall outlet to supply electricity to contacts (not shown) in the housing 64 that contact the contacts 60 of the apparatus 10. In alternate embodiments, any suitable type of recharger or recharger stand could be provided.

With the embodiment described above, the apparatus 10 can be used for both night walking of a pet or, by merely keeping the switch 54 OFF, for daylight walking of a pet. The apparatus 10 only requires a user to use one hand. This allows the user to have one hand free, such as to put in his or her pocket during cold weather' or to hold other objects. For example, the free hand could be used to carry groceries back from a store or, for a K-9 police officer, to hold a firearm. The combined tractable leash and integral flashlight apparatus 10 thus performs two function from a single apparatus.

Figure 4A:
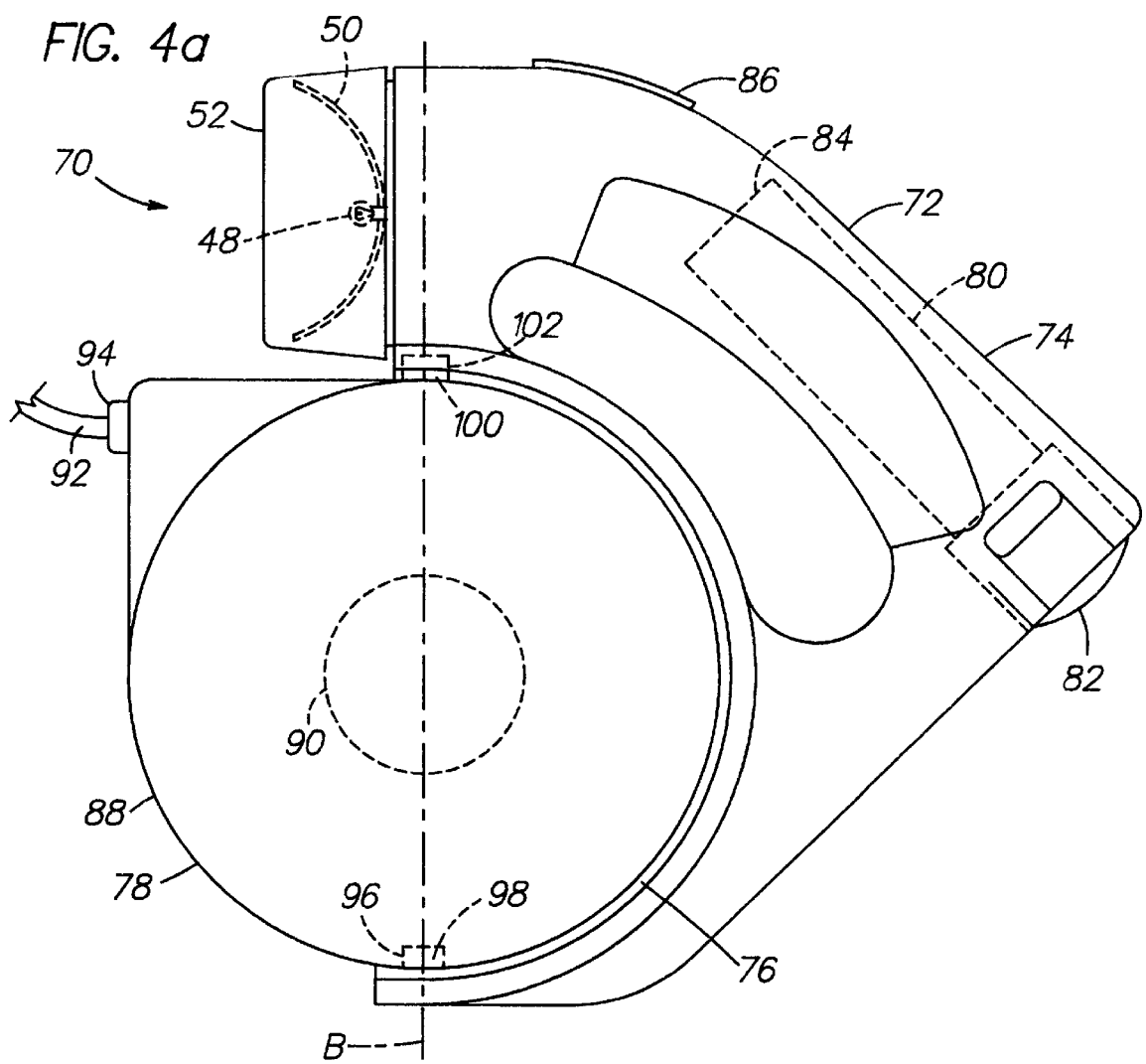
FIG. 4a is a side view of an alternate embodiment of the present invention.

Referring now to FIGS. 4A and 4B, an alternate embodiment of the present invention is shown. The apparatus 70 includes a first housing section 72 with a handle section 74 and a receiving area 76. The apparatus 70 also includes a retractable leash section 78 that is located in the receiving area 76 and is pivotably connected to the first housing section 72. The handle section 74 has a battery receiving area 80 for removably receiving a battery 82. In the embodiment shown, the battery 82 is a rechargeable battery with two terminals at one end. Preferably, the battery is a VERSAPAK battery sold by Black & Decker (U.S.) Inc. VERSAPAK is a trademark of The Black & Decker Corporation of Towson, Md. However, any suitable type of battery could be used. Terminals (not shown) inside the first housing section 72 at the interior end 84 of the battery receiving area 80 are electrically connectable to light bulb 48 by the switch 86. The light bulb 48, similar to the embodiment shown in FIGS. 1–3, is connected to a reflector 50. The reflector 50 is connected to the first housing section 72 by the cover 52 at the front top portion of the first housing section 72.

The retractable leash section 78 includes a second housing section 88, a reel or roller 90, and a spring located in the reel 90 and having an end connected to the second housing section 88. The reel 90 is rotatably connected to the second housing section 88 for rotation about an axis A. One end of the spring is connected to the reel 90. One end of the leash 92 is connected to the reel 90, is wrapped around the reel 90, and extends out of the second housing section 88 at the outlet 94. The bottom of the second housing section 88 has a seat 96. The bottom of the first housing section 72 has a pin section 98 that projects into the receiving area 76. The pin section 98 extends into the seat 96. Similarly, the top of the second housing section 88 has a pin section 100 and the top of the first housing section 72 at the receiving area 76 has a seat 102. With this arrangement, the second housing section 88 is pivotably connected to the first housing section 72 for rotation about an axis B. The axis A is orthogonal to the axis B. Thus, the retractable leash section 78 can pivot relative to the first housing section 72. This allows a user to more easily redirect light from the lighting section of the apparatus 70 by merely turning the first housing section 72 with a reduced amount of torque on the user's hand if the user's pet is pulling on the leash 92. Although a leash break device is not shown in this embodiment, one could easily be added by extending a control through the pivot points 96, 98 and/or 100, 102 or, moving a portion of the retractable leash section 78 relative to the first housing section 72.

Referring now to FIG. 5, another alternate embodiment of the present invention is shown. In this embodiment the apparatus 110 has a lighting section 112 at a top front of the housing 114. The frame 116 of the lighting section 112 is pivotably mounted to the housing 114 to angularly move as indicated by arrow C. Thus a user can angularly adjust the beam of light from the apparatus 110 in a horizontal plane without angularly moving the frame 114.

Referring now to FIG. 6, another alternate embodiment is shown. In this embodiment, the apparatus 120 has a lighting section 124. The frame 126 of the lighting section 122 is movably mounted to the housing 124 to angularly pivot as indicated by arrow D. Thus, a user car angularly adjust the beam of light from the apparatus 120 in a vertical direction. This may be desirable dependent upon the type of pet or the environment and visibility without the user sacrificing holding comfort of the apparatus; especially if the pet pulls a lot or needs to be pulled on a lot.

Referring now to FIG. 7, another alternate embodiment of the invention is shown. In this embodiment, the apparatus 130 has a main unit 132 and a holding frame 134. The main unit 132 is pivotably mounted on the holding frame 134. The main unit 132 includes a retractable leash section 136 and a lighting section 138 inside the housing 140. A switch 142 is provided on the housing 140 for the lighting section 138. The battery 144 for the lighting section 138 is also located in the housing 140. A button 146 on the holding frame 134 is connected to the retractable leash section 136 at a pivot point between the main unit 132 and frame 134 to control extension and retraction of the leash 137. With this embodiment, the light beam can follow the pet.

Figure 8:
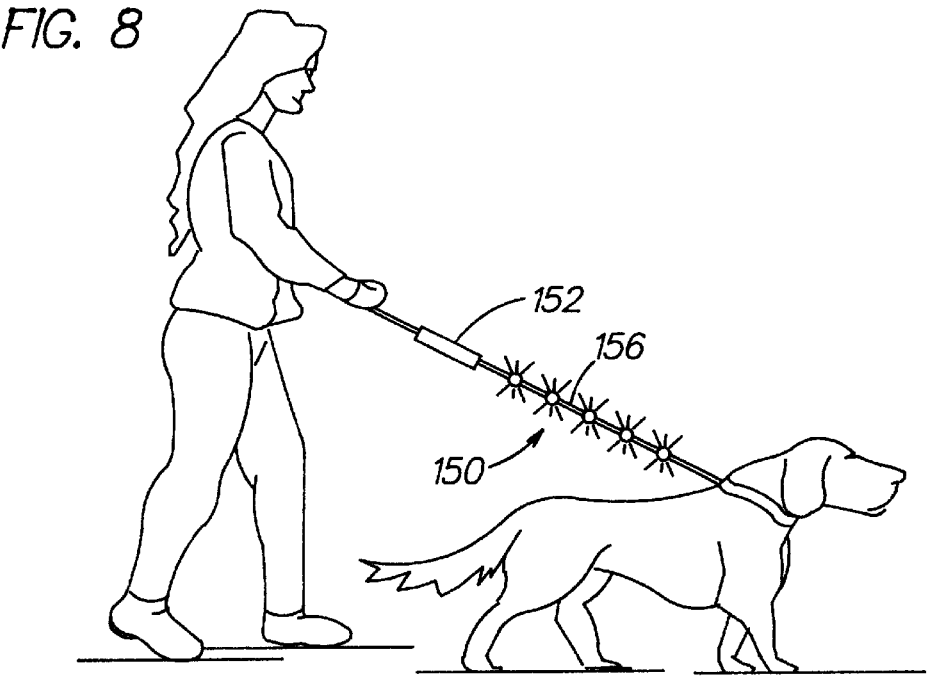
FIG. 8 is a schematic view of a person walking a dog with an alternate embodiment of the present invention.
Figure 9:
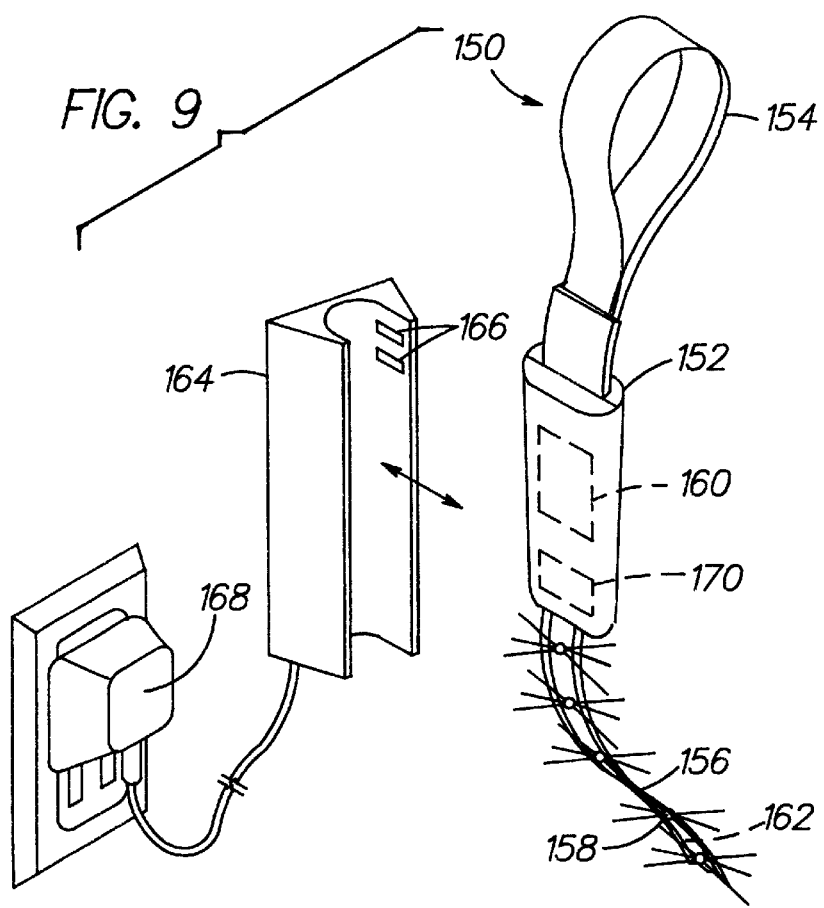
FIG. 9 is a schematic perspective view of the combined retractable leash and flashlight assembly shown in FIG. 8 and its battery recharging stand.

Referring now to FIGS. 8 and 9, another alternate embodiment is shown. In this embodiment the apparatus 150 has a housing 152, a hand strap 154, and a leash 156. The apparatus 150 does not include a leash retraction device. Located on the leash 156 are a plurality of light bulbs 158 electrically connected to a battery 160 in the housing 152 by an electrical conductor 162 that extends along the leash 156. The battery 160 is a rechargeable battery. The housing is sized and shaped to fit into a recharger stand 164. The stand 164 has electrical contacts 166 and a transformer 168 that is plugged into an electrical wall outlet.

In an alternate embodiment, the housing 152 could be provided with a light source 170. The electrical conductor 162 could be replaced by a light conductor, such as a fiber optic bundle or light tube. In such an alternate embodiment, the bulbs 158 need not be provided or could be replaced by lens at ends of the light conductor.

Figure 10:
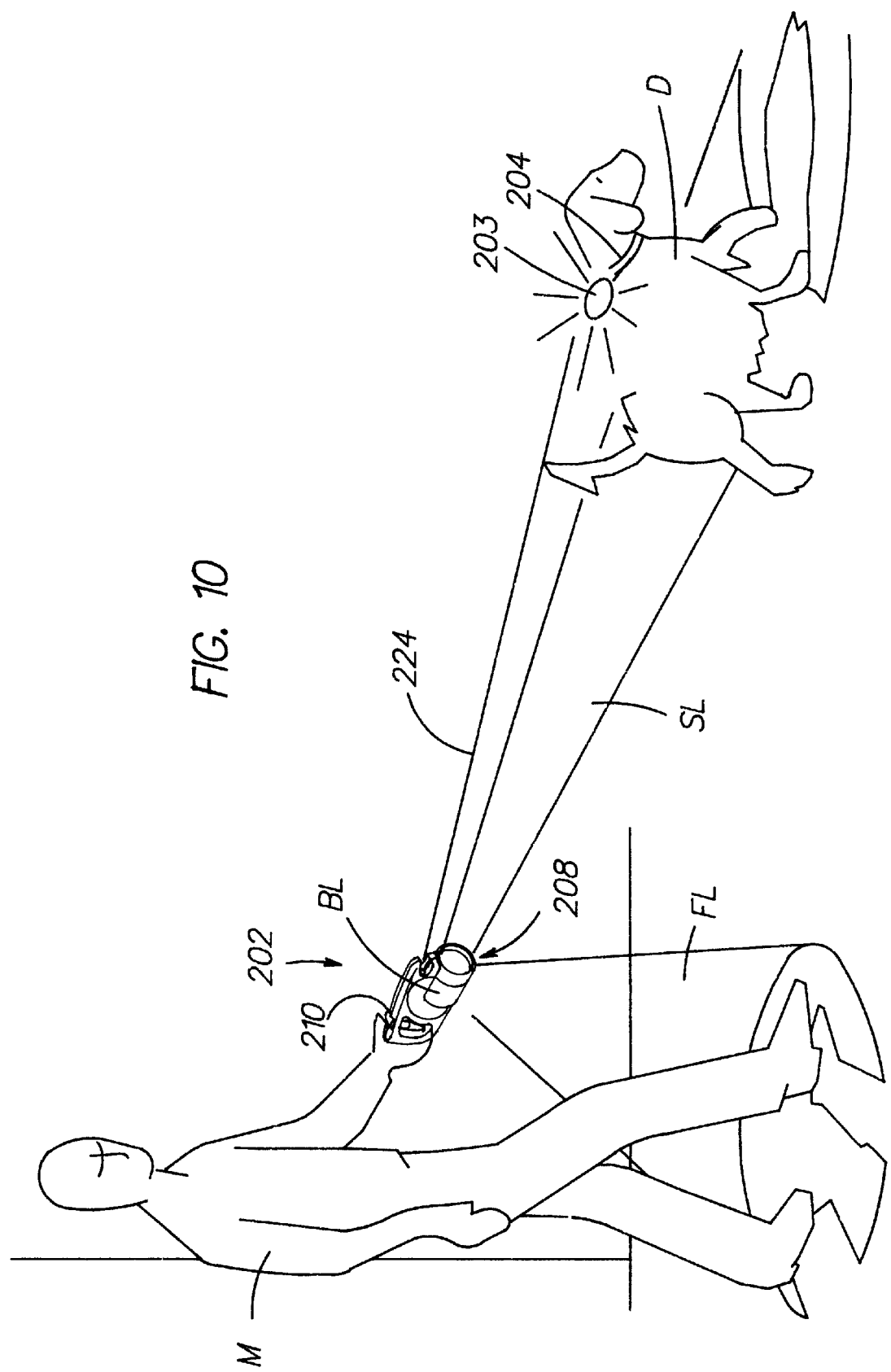
FIG. 10 is a schematic view of a person walking a dog with an embodiment of the invention.

Referring first to FIG. 10, an additional embodiment of the retractable leash of the present invention is indicated generally by reference numeral 202. Many retractable leash devices are presently on the market, and the mechanisms employed in same will suffice for use with the present invention. Typical of such well-known retractable leash mechanisms that would be suitable for use with the present invention are those manufactured by Flexi USA Inc. of Cincinnati, Ohio, known as their "Standard", "Compact", and "Special" lines.

Retractable leash 20 typically includes a plastic case 200 within which is housed a spring-loaded wind-up mechanism which allows leash 224 to be extended from and withdrawn into case 210. The other end of leash 224 normally includes a clasp for engaging the collar 20 of a dog D or other animal. Typically, a user or master M may control the amount of the leash which is released from case 210. Also, when the distance between dog D and master M decreases, leash 224 automatically retracts within case 110, as is well known.

In accordance with the present invention, means are provided for permitting the retractable leash 202 to be safely used at night. More particularly, case 210 includes a built in lighting system 208 which is preferably able to provide three distinct types of illumination.

Lighting system 208 emits a strong forward spotlight indicated by reference letter SL for illuminating dog D and/or the forward walking path. The direction of spotlight SL is controlled by master M who grips case 210 in the manner shown.

Secondly, lighting system 208 emits a downwardly directed flood light indicated generally by reference letters FL. Flood light FL helps to illuminate the path in the immediate vicinity of master M. Finally, lighting system 208 is capable of emitting a flashing beacon light indicated generally by reference letters BL. Beacon light BL is used to indicate the location of master M when either the spotlight SL or flood light FL are turned off, or it can serve as a general warning light.

In addition to the lighting system 208 located in the case 210, the distal end of leash 224 has positioned thereon a flashing beacon unit 203 attached to the dog's collar 204. Beacon unit 203 helps master M keep track of the location of dog D.

Referring now to FIG. 111, reference numeral 10 indicates the case, formed of plastic, which contains the retractable leash mechanism as is well-known. At the rear of case 210 is located a handle 218 that in turn defines a hand opening 215 to enable case 210 to be gripped by the user. Positioned within opening 215 is a trigger/lock mechanism 214 which conventionally controls the extension of leash 224 from casing 210. Handle 218 may contain rechargeable batteries.

A switch 212 is provided on top of casing 210. Switch 212 preferably has three positions "flood" (during which flood light FL is illuminated); (2): "flood/spot" (during which flood light FL and spotlight SL are both illuminated); and (3): flood/spot/beacon" (during which flood light FL, spotlight SL and beacon light BL are all energized). Shown rearwardly of switch 212 in case 210 is a release slot 216 for switch 212. Inside case 210 is located a recoil mechanism, indicated generally by reference numeral 244, for leash 224.

In the forward top portion of case 210 is positioned an arcuate beacon locator notch 222 within which the dog-locating beacon unit 203 may be positioned. Located within beacon locator notch 222 is an aperture 221 from which extends the retractable leash 224, which is typically and preferably made of nylon cord. Also located within notch 222 are a pair of contacts 220 (only the lower contact is shown in FIG. 11), for recharging the beacon unit 203, as will become more clear hereinafter.

Extending forwardly from beacon unit 203 is a conventional clip or leash clasp 234 for attaching to the dog's collar. Coupling leash 224 to beacon unit 203 and its attached clasp 234 is a quick release mechanism indicated generally by reference numeral 226 which permits beacon unit 203 and clasp 234 to be quickly separated from leash 224. Quick release mechanisms of the type envisioned for use with the present invention are well-known in the art.

The dog-locating beacon unit 203 has a shape which is complimentary to that of beacon locator notch 222 so as to fit therewithin. On the top and bottom of beacon unit 203 are positioned a pair of electrical contacts 228 (only the top contact appears in FIG. 11) which mate with contacts 220 to allow beacon unit 203 to be recharged when positioned in beacon locator notch 222.

Figure 11:
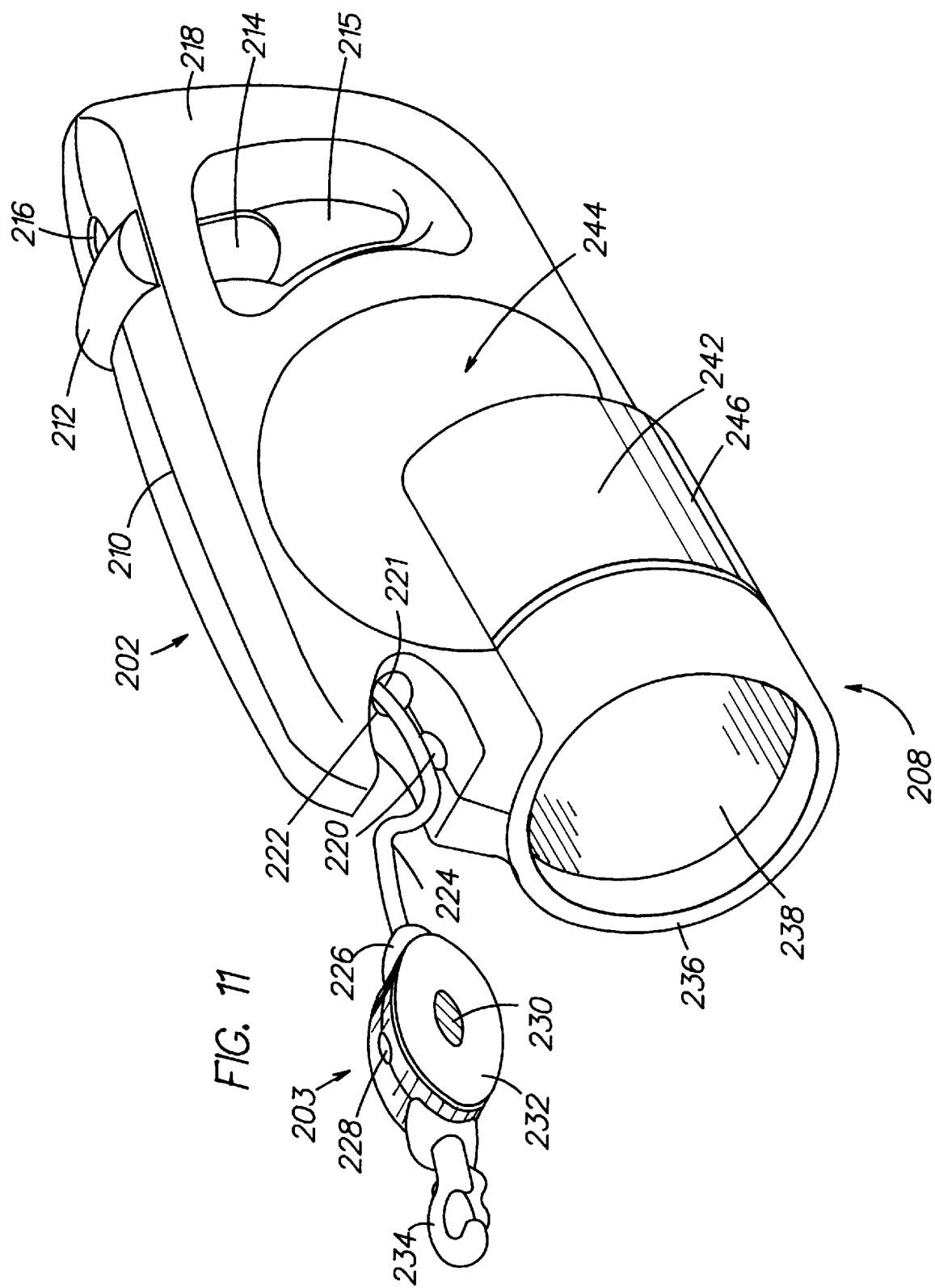
FIG. 11 is a perspective view of an additional embodiment of the invention.

On each side of beacon unit 203 are positioned a pair of red lenses 232 (only one of which appears in FIG. 11). Reference numeral 230 indicates a label that covers the assembly screw for beacon unit 203. Internally of beacon unit 203 is positioned any suitable lighting means. For example, inside beacon unit 203 may be located a double-sided printed circuit board having two surface mounted LEDs and associated circuitry for causing the LEDs to flash; this flashing illumination is visible through lenses 32.

The lighting system 208 incorporated into case 210 preferably includes a lower semicylindrical white lens 240 to emit flood light FL, an upper semi-cylindrical red lens 242 to emit beacon light BL, and a clear, forwardly positioned lens 238 for emitting spotlight SL. Lens 238 is held in an opaque lens holder 236 which is secured to case 210.

Figure 12:
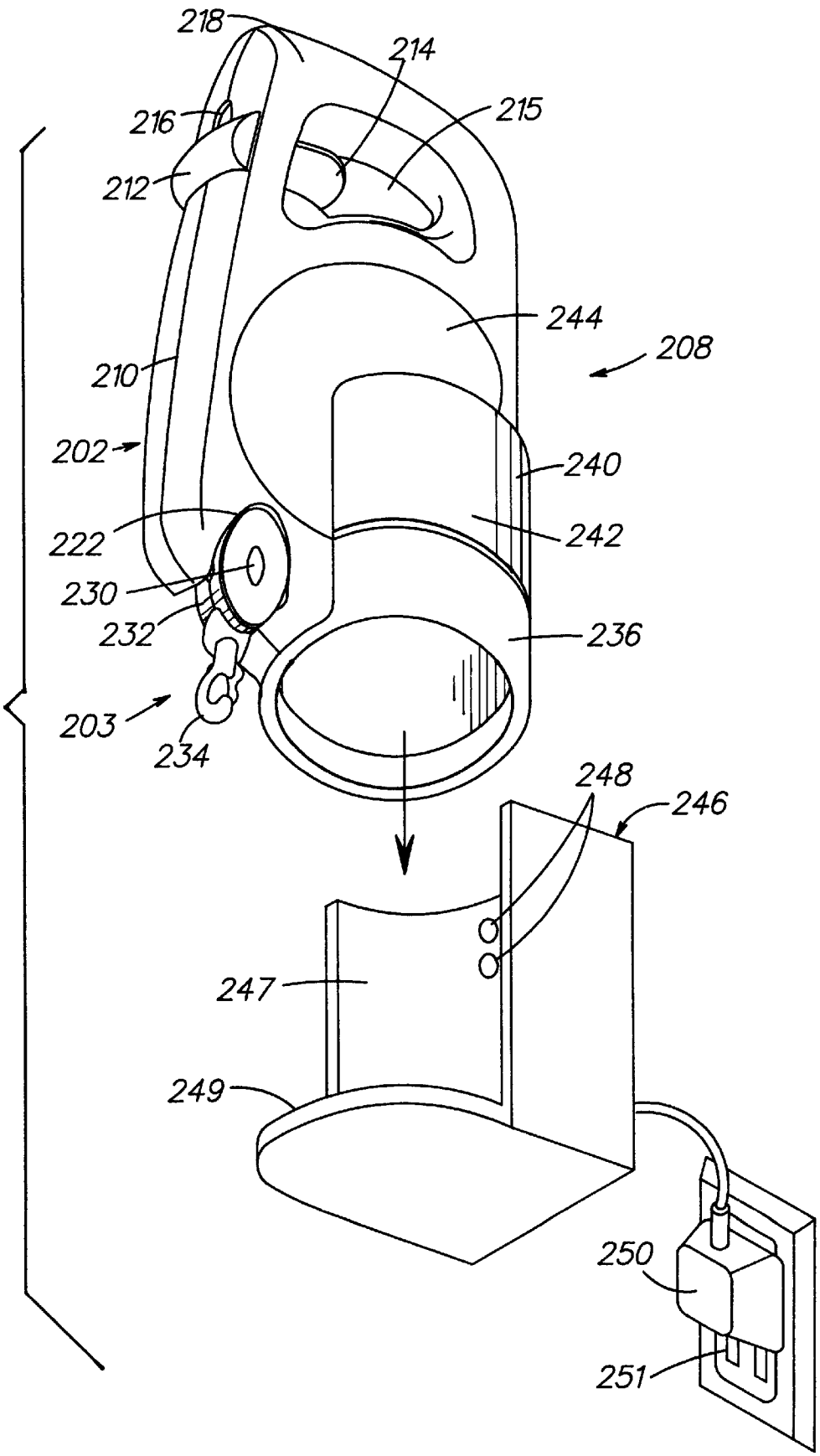
FIG. 12 is a perspective view of an embodiment in which the system is inserted into a charging unit.

Referring now to FIG. 12, the beacon unit 203 is shown retracted or placed within beacon locator notch 222 in case 210. In this position, the retractable leash 202 of the present invention is ready for its internal batteries of both the lighting system 208 and the beacon unit 203 to be recharged. This is done, for example, by placing the present invention 202 within a recharging bracket 246 that is preferably wall-mounted. Bracket 246 preferably includes a rear wall 247 having a curved surface which is shaped complimentary to the exterior surface of lighting system 208, and a flat base 249 onto which the present invention 202 may be placed during recharging. Reference numeral 248 indicates recharging contacts located in rear wall 247 of recharging bracket 246, while reference numeral 250 indicates a transformer for plugging into a conventional wall outlet 251. In this manner, the present invention 202 may be recharged easily and conveniently while not in use.

Figure 13:
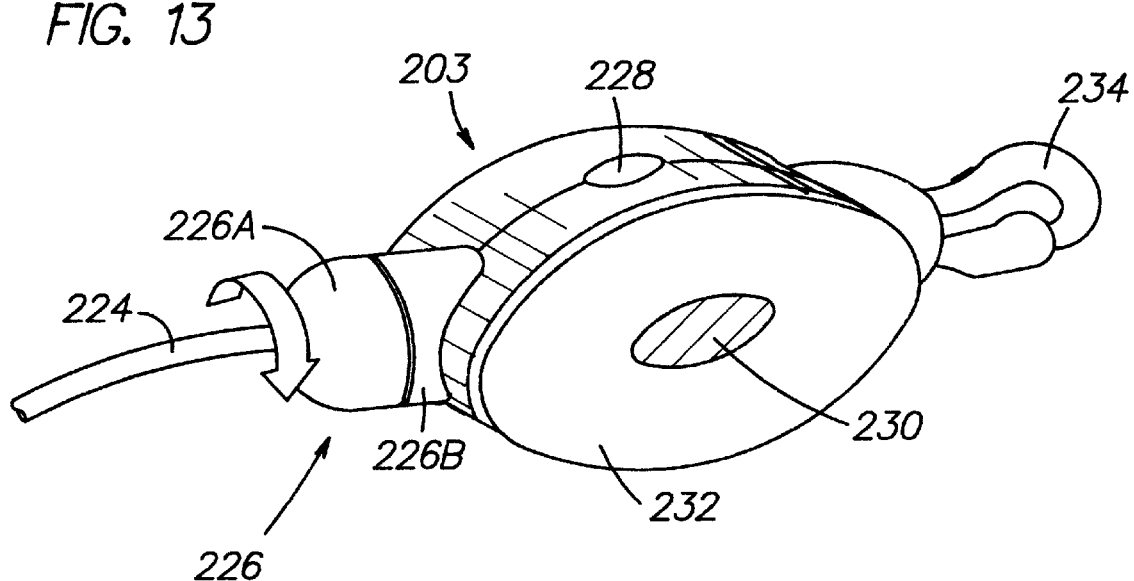
FIG. 13 is a reverse perspective view of the dog-locating beacon unit.

FIG. 13 is a reverse perspective view of the dog-locating beacon unit 203 wherein the quick release mechanism 226 is shown in somewhat greater detail. Quick-release mechanism 226 is seen to include mating couplings 226A and 226B which are typically joined and disconnected by rotating one of the units relative to the other, as illustrated by the arrow in FIG. 13.

Figure 14:
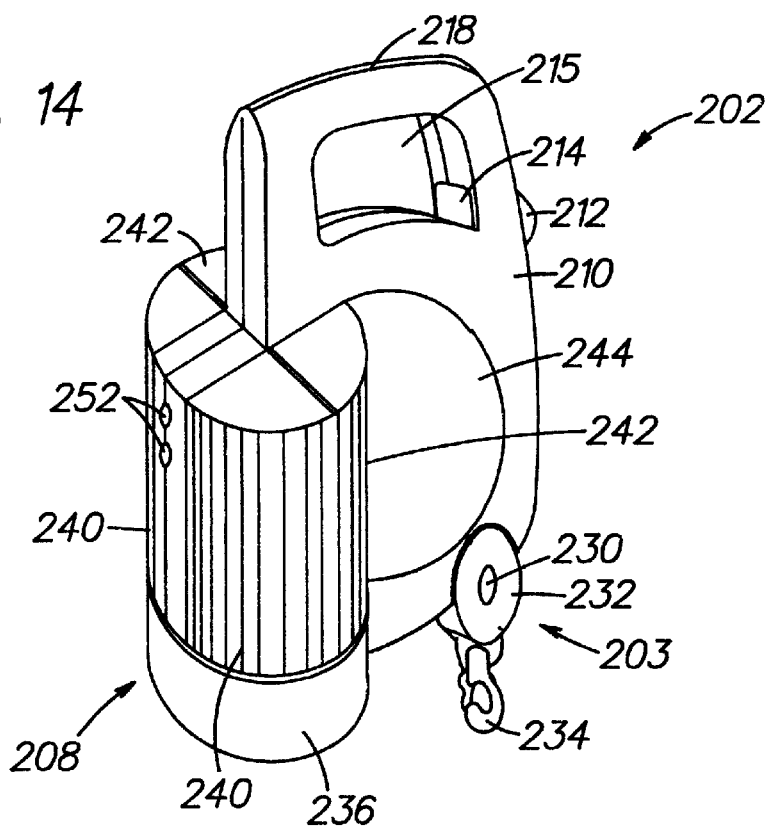
FIG. 14 is a reverse perspective view of the outer case.

FIG. 14 is a reverse perspective view of the case 210 which shows a pair of recharging contacts 252 on the underside of lighting system 208. Recharging contacts 252 are adapted to mate with recharging contacts 248 located in wall bracket 246 (FIG. 12).

Figure 15:
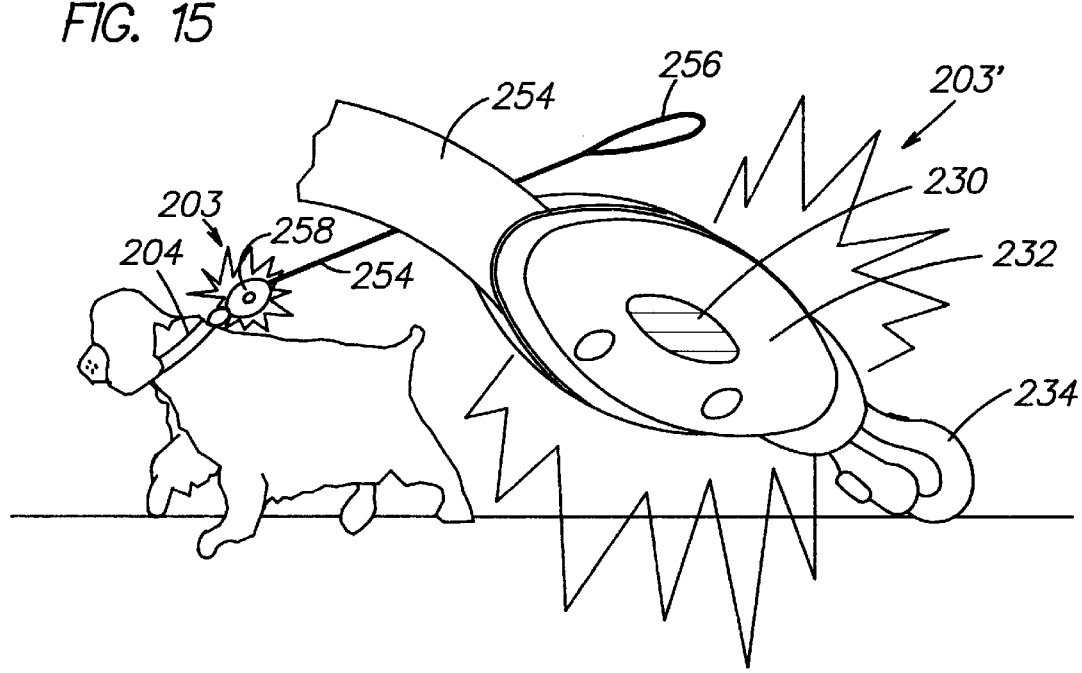
FIG. 15 is a perspective view of an additional embodiment.

FIG. 15 shows an alternate embodiment of the present invention wherein a modified form of a dog-locating beacon unit 203' is utilized with a conventional (non-retractable) nylon webbing leash 254. At one end of leash 254 is located a sewn loop 256 to provide a hand-hold for the master. At the other end of leash 254 is positioned dog-locating beacon unit 203' which is designed to be attached to the dog's collar 204 by leash clasp 234. In this embodiment, since there is no base or recharging case, beacon unit 203' needs to include a self-contained battery therein for powering same. The lighting mechanism employed by unit 203' may still include alternating 2-sided LEDs, as with the first embodiment. Leash 254 may also be imprinted with graphics thereon, such as walking, "heeling, running, fetching", sit, play, etc.

Figure 16:
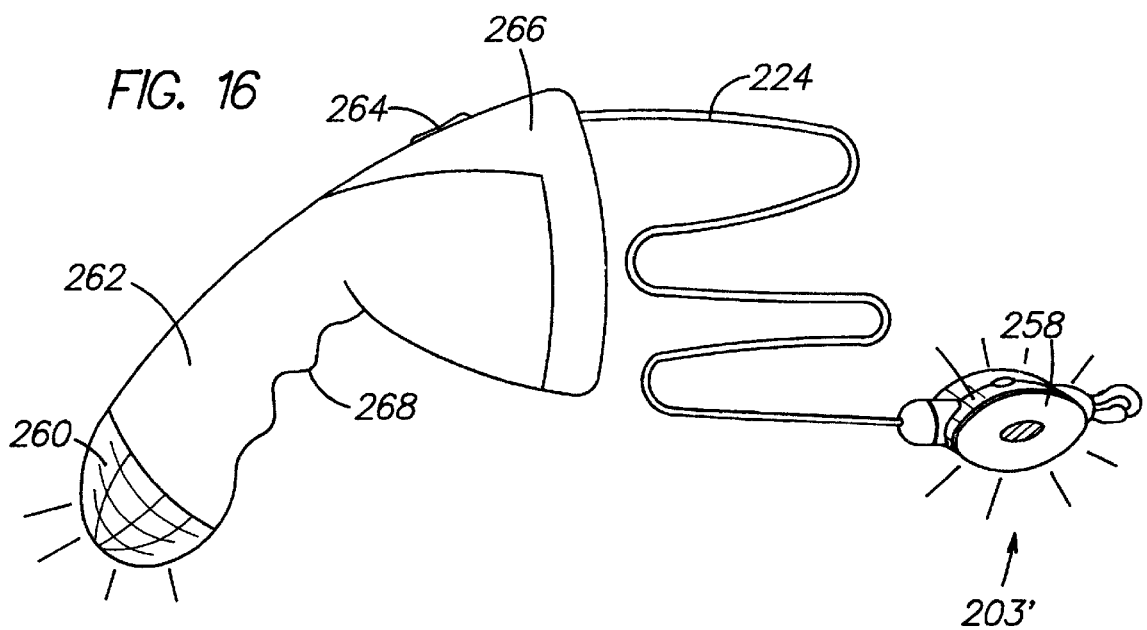
FIG. 16 is an additional alternative embodiment.

In FIG. 16 is illustrated a still further alternate embodiment of the present invention which employs the same dog-locating beacon unit 203' as with the previous embodiment of FIG. 5, including self-contained batteries 258 as a source of power therefor. However, in the embodiment of FIG. 6, leash 224 is connected to a flashlight-type body 262 which may be formed, for example, of over-molded rubber with a built-in hand grip 268. Reference numeral 264 indicates a light switch for flashlight unit 262, while reference numeral 266 indicates a lens hood and holder for leash 224 which may be wrapped therein. The flashlight body 262 is designed to throw a forward spotlight for illuminating whatever area is desired. Further, at the rear thereof flashlight body 262 may also be provided with a beacon lens 260 (e.g., which may be red) to emit a rear light, flashing or steady as may be desired. Both the forward light and the rear light may be controlled by light switch 264.

The embodiment of FIG. 16 is intended as a lower cost alternative to other disclosed embodiments, and the embodiment of FIG. 15 is intended as an even lower cost alternative that of FIG. 16. The embodiment of FIG. 15 comprises a very basic unit that incorporates only a dog-locating beacon with a low-cost leash.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. The combination of a retractable dog leash and light, comprising:

a housing, said housing comprising an external surface encompassing an internal volume, said internal volume being segregated into a plurality of regions including a reel region, a light region, a control region, and a handle region;

said reel region being essentially circular and including a vertical diameter having a top end and a bottom end, said reel region including a spring-loaded, retractable reel rotatably mounted therein, said reel having a leash connected thereto for extension from and retraction into said reel through a leash aperture in said external surface of said housing, said leash extending substantially in a forward direction from said housing;

said light region housing a lens, a light, and a lens holder secured to said housing;

said control region including a control mechanism for controlling said leash and a light switch for turning on and off a light beam produced by said light, said light beam also extending substantially in a forward direction from said housing;

said handle region being columnar and extending substantially vertically and having a top end and bottom end and a hollow handle, said hollow handle adapted to contain batteries therein for powering said light;

an open hand-hold positioned between said handle region and said reel region, said open hand-hold comprising an elongated opening extending transversely through said housing for receiving the fingers of the user of said combination retractable dog leash and light, said elongated open hand-hold extending substantially vertically and having a top end and a bottom end;

the vertical extensions of said columnar handle region, said elongated open hand-hold, and said vertical diameter of said reel being substantially parallel with each other and being approximately orthogonal to said forward direction of said leash extension; and said light region being separated from at least a portion of said handle region by at least a portion of said reel region, and said control region being adjacent said reel region and adjacent said top end of said open hand-hold.

* * * * *